Figure 1:
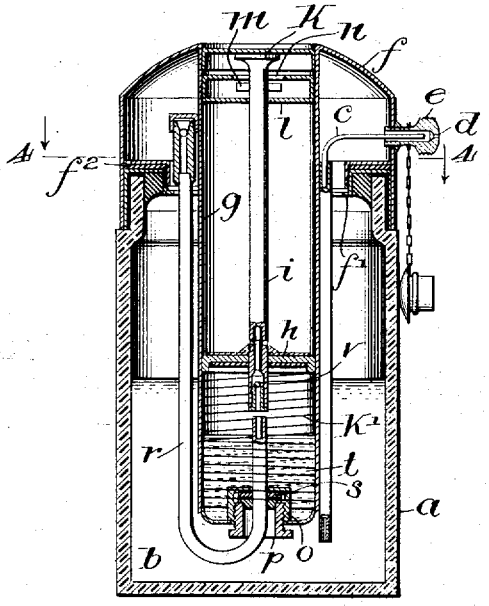

No. 12,176. REISSUED NOV. 24, 1903.

W. SAMS.

ATOMIZING DEVICE.

APPLICATION FILED OCT. 27, 1903.

Witnesses:
C. H. Crawford
Leon Stroh

Inventor:-
Walter Sams
by George L. Gragg
his Attorney

No. 12,176. Reissued November 24, 1903.

UNITED STATES PATENT OFFICE.

WALTER SAMS, OF CHICAGO, ILLINOIS.

ATOMIZING DEVICE.

SPECIFICATION forming part of Reissued Letters Patent No. 12,176, dated November 24, 1903.

Original No. 738,848, dated September 15, 1903. Application for reissue filed October 27, 1903. Serial No. 178,801.

*To all whom it may concern:*

Be it known that I, WALTER SAMS, a citizen of the United States, residing at Chicago, in the county of Cook and State of Illinois, have invented a certain new and useful Improvement in Atomizing Devices, of which the following is a full, clear, concise, and exact description, reference being had to the accompanying drawings, forming a part of this specification.

My invention relates to spraying apparatus, and particularly to perfumery bottles or receptacles employing the same, though I do not wish to be restricted to this particular adaptation of the invention.

As is well known to those familiar with perfumery-bottles that are equipped with spraying mechanism, there is employed a cylinder with a plunger therein and a containing vessel for the perfumery surrounding the cylinder and having communication with its interior, the lubrication of the working parts being effected by means of the perfumery finding its way to the interior of the cylinder. The objection to this class of apparatus will be readily understood. The perfumery at best is a poor lubricant, and it contains reagents that are likely chemically to combine with the metal or other material within the cylinder to produce a substance, as verdigris, that will tend to lock the piston in place. Considerable effort has frequently to be resorted to in order to free the piston after the bottle has been unused for a considerable length of time.

It is the object of my invention to provide a construction whereby the use of the perfumery as a lubricant may not be required and whereby the perfumery is prevented from having access to the working cylinder.

The apparatus of my invention enables me to employ lubricating-oil within the cylinder, which by reason of the separation of the cylinder from the surrounding bottle or casing does not mix with the perfumery.

Generally speaking, my invention comprises in its preferred embodiment a bottle or casing for the perfumery, within which there is projecting a cylinder that is desirably of such length as to project within the perfumery when any appreciable quantity thereof is contained in the bottle. There is arranged within this cylinder a reciprocating piston adapted, through the agency to be hereinafter described, to force air into the bottle, which is sealed save for the ejection-opening, this air serving to cause the perfumery to become ejected. There should be contained in the bottom of the cylinder lubricating-oil of a high grade, which may be supplied to the cylinder in sufficient quantity to last a number of years. In order that this lubricating-oil may not find a passage to the surrounding bottle and at the same time to permit the air to be forced into the bottle, there is provided a connection between the interior of the cylinder and the interior of the bottle, through which connection or duct the air may be forced and which is so located with reference to the oil that the oil cannot be forced therethrough. I preferably so arrange this duct with reference to the cylinder that it will be immaterial in what position the bottle may be, whether it is upside down, for the purpose of oiling the piston, or whether the bottle is upon its side, the oil will be prevented from passing through the duct. This result is most desirably accomplished by shaping the duct in the form of a gooseneck, whose shorter end extends from the bottom of the cylinder and whose longer end extends well above the level of the perfumery. A stuffing-box surrounds that portion of the gooseneck passing through the bottom of the cylinder, so as to thoroughly seal this portion of the cylinder. The perfumery finds egress, preferably, at the upper portion of the bottle and with the aid of suction, there being provided at the exit-opening a spraying-nozzle into which an eduction-tube is led from the bottom of the bottle. The air finds direct passage through the nozzle, and as a consequence of the vacuum that tends to be formed at the nozzle in front of the eduction-tube the perfumery is withdrawn.

I will explain my invention more fully by reference to the accompanying drawings, in which—

Figure 2:
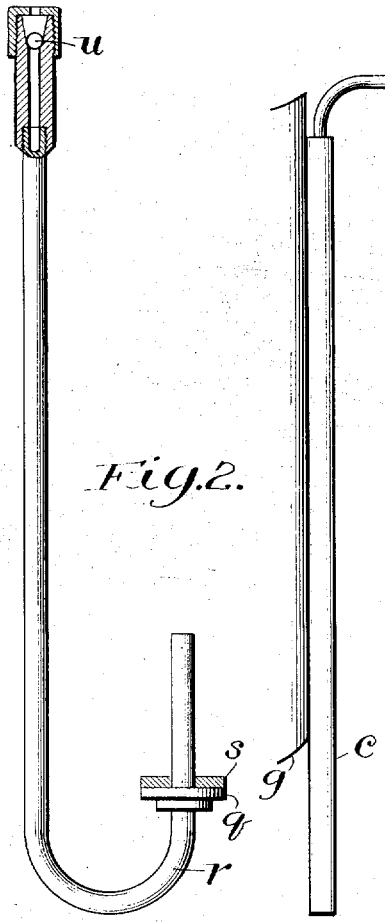
Figure 3:
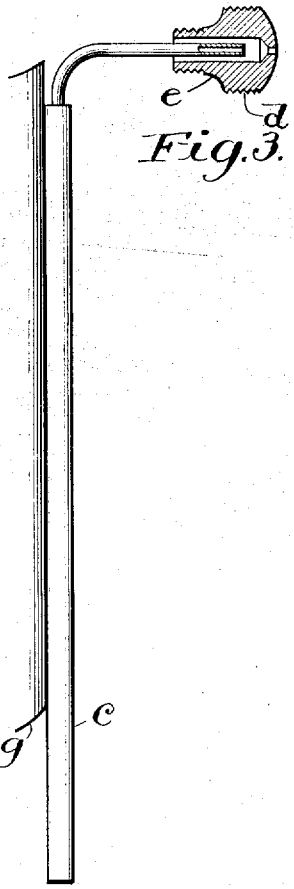
Figure 4:
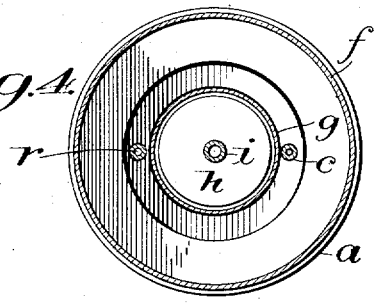

Figure 1 is a vertical sectional view of a spraying or atomizing device constructed in accordance with my invention. Fig. 2 is a detail view of the gooseneck-duct, part being shown in section. Fig. 3 is a side elevation of the eduction-tube with a spraying-nozzle in association therewith, portions of the structure being shown in section. Fig. 4 is a sectional plan view on line 4 4 of Fig. 1.

Like parts are indicated by similar characters of reference throughout the different figures.

The particular embodiment of the invention herewith shown is applied to a perfumery bottle or vessel *a*, in which is disposed the perfumery *b* in a liquid state It is to be understood, however, that other liquids are adapted to be atomized by the device of the invention.

The eduction-tube *c* projects into the perfumery, the eduction-tube in this instance being curved to present a horizontal stretch of its bore to the nozzle-opening *d*, that may be formed in a nozzle-plug *e*, that screws into an opening provided in the cap-section *f* of the bottle or casing, which section is preferably made of metal. This portion of the structure is well understood by those skilled in the art. The liquid *b* is forced through a duct or tube *c* by means of air that is under pressure within the bottle, the air finding passage through the annular space surrounding the eduction-tube and through the opening *d*, causing the liquid to be sucked through the tube *c*.

The cap-section *f* is preferably removably secured in place, for which purpose it may have threaded engagement with a nether cap portion *f'*, and in order that the joint between the cap portions may be most effectively sealed there is interposed between the same an annular packing-gasket $f^2$. The cap *f* is provided with a cylindrical extension *g*, that constitutes the operating-cylinder of the apparatus. The plunger or piston *h* is designed to work back and forth within the cylinder *g*, being for the purpose carried upon a piston-rod *i*, that terminates at its upper end in a button *k*, designed to be engaged by the thumb or finger of the user, and which is adapted for free reciprocal movement within the bore of the cylinder. The coiled spring *k'* is interposed between the bottom of the cylinder and the piston and tends to force the piston upwardly, which tendency is counteracted when the bottle is not in use by means of a head *l*, that has threaded engagement with the cylinder *g* and is adapted for engagement with a cross-pin *m*, carried by the piston-rod *i* when this cross-pin does not register with a slot *n*, provided in the upper wall of the head *l*. When it is desired to use the bottle, the pin *m* is brought into the same plane with the slot *n*, so that the piston and piston-rod may be freely reciprocated.

The lower end of the cylinder *g* is closed by means of a stuffing-box that desirably comprises an inwardly-projecting cylindrical box portion *o* and gland *p*, having threaded engagement with the interior of the said box portion, there being interposed between the top wall of the box portion *o* and a collar *q*, provided upon the air duct or pipe *r*, a packing-ring *s*. The air-duct *r* is curved at its bottom, the shorter end of the duct projecting within the cylinder *g*, preferably through its bottom and above the level of the oil *t* in the cylinder. The longer end of the air-duct projects considerably above the liquid *b* and is provided at its end with a valve *u*, that will permit air to be forced into the bottle, yet it will prevent the return of this air, the air being limited to the opening *d* in its egress.

The piston-rod *i* may or may not be equipped with a valve, as desired. In some instances the piston, which is desirably formed of leather, may be adapted to also act as a valve, while in other instances the addition of a special valve *v* of well-known construction may be had.

When it is desired to lubricate the piston, the bottle may be turned on its side or placed upside down, in which position it is obvious that oil is not readily adapted to find passage through the duct *r*, especially if a sufficiently limited quantity of oil is placed within the cylinder. The spring *k'* also aids in carrying lubricating-oil to the piston.

I have used the term "cylinder" in its functional sense and do not wish to be limited to the form of this element having the functions I have provided for it, as obviously the particular shape of this element is not an essential to its operativeness.

It is obvious that changes may readily be made in the embodiment of my invention that I have shown without departing from the spirit of the invention, and I do not, therefore, wish to be limited to the precise construction shown; but,

Having thus described my invention, I claim as new and desire to secure by Letters Patent—

1. In an atomizing device, the combination with a vessel for containing fluid to be atomized, of a cylinder projecting within the vessel, an air-duct establishing communication between the cylinder and the vessel, the said duct projecting into the cylinder so that oil may surround the same without finding passage through the duct into the inclosing vessel, means for forcing air through said duct and a nozzle in communication with the fluid to be sprayed, through which nozzle the air and fluid pass, substantially as described.

2. In an atomizing device, the combination with a vessel for containing fluid to be atomized, of a cylinder projecting within the vessel, an air-duct establishing communication between the cylinder and the vessel, the said duct projecting into the cylinder so that oil may surround the same without finding passage through the duct into the inclosing vessel, a piston within the cylinder for forcing air through said duct and a nozzle in communication with the fluid to be sprayed through which nozzle the air and fluid pass, substantially as described.

3. In an atomizing device, the combination with a fluid-containing vessel, of a cylinder projecting within the same and adapted to contain a lubricant, having its interior sealed with respect to the vessel in a manner to maintain the fluid in the vessel and the lubricant in the cylinder in separate bodies, a duct establishing communication between the cylinder and the vessel for the passage of air, the said duct projecting into the central portion of the cylinder and terminating sufficiently above the bottom thereof to afford a space for the lubricant, and at its other end projecting sufficiently above the bottom of the vessel to afford space for the fluid in the vessel, means for forcing air through the said duct and a nozzle in communication with the fluid to be sprayed, through which nozzle the air and fluid pass, substantially as described.

4. In an atomizing device, the combination with a fluid-containing vessel, of a cylinder projecting within the same and adapted to contain a lubricant, having its interior sealed with respect to the vessel in a manner to maintain the fluid in the vessel and the lubricant in the cylinder in separate bodies, a duct establishing communication between the cylinder and the vessel for the passage of air, the said duct projecting into the central portion of the cylinder and terminating sufficiently above the bottom thereof to afford a space for the lubricant, means for forcing air through the said duct and a nozzle in communication with the fluid to be sprayed, through which nozzle the air and fluid pass, substantially as described.

5. In an atomizing device, the combination with a vessel for containing fluid to be atomized, of a cylinder projecting within the vessel, an air-duct establishing communication between the cylinder and the vessel, the said duct projecting into the cylinder so that oil may surround the same without finding passage through the duct into the inclosing vessel, means for forcing air through said duct and a nozzle in communication with the fluid to be sprayed, through which nozzle the air and fluid pass, the said air-duct projecting sufficiently above the bottom of the vessel to afford space for the fluid in the vessel, substantially as described.

6. In an atomizing device, the combination with a fluid-containing vessel, of a cylinder projecting within the same and adapted to contain a lubricant, having its interior sealed with respect to the vessel in a manner to maintain the fluid in the vessel and the lubricant in the cylinder in separate bodies, a duct establishing communication between the cylinder and the vessel for the passage of air, the said duct projecting into the central portion of the cylinder and terminating sufficiently above the bottom thereof to afford a space for the lubricant and at its other end projecting sufficiently above the bottom of the vessel to afford space for the fluid in the vessel, a piston working within the cylinder for forcing air through the duct and a nozzle in communication with the fluid to be sprayed, through which nozzle the air and fluid pass, substantially as described.

7. In an atomizing device, the combination with a fluid-containing vessel, of a cylinder projecting within the same and adapted to contain a lubricant, having its interior sealed with respect to the vessel in a manner to maintain the fluid in the vessel and the lubricant in the cylinder in separate bodies, a duct establishing communication between the cylinder and the vessel for the passage of air, the said duct projecting into the central portion of the cylinder and terminating sufficiently above the bottom thereof to afford a space for the lubricant, a piston working within the cylinder for forcing air through the duct, and a nozzle in communication with the fluid to be sprayed, through which nozzle the air and fluid pass, substantially as described.

8. In an atomizing device, the combination with a fluid-containing vessel, of a cylinder therein, a duct passing through the bottom portion of the cylinder sufficiently to afford a space for containing the lubricant and extending into the vessel, a piston adapted to be moved back and forth within the cylinder to force air into the vessel, a nozzle provided upon the vessel and a duct intervening between the nozzle and the fluid in the vessel, substantially as described.

9. In an atomizing device, the combination with a fluid-containing vessel, of a cylinder within the same and adapted to contain a lubricant, having its interior sealed with respect to the vessel in a manner to maintain the fluid in the vessel and the lubricant in the cylinder in separate bodies, a bent or curved pipe extending through the bottom of the cylinder a sufficient distance above said bottom to afford a space for the lubricant and extending into the vessel, a spraying-nozzle, and a duct or pipe establishing communication between the spraying-nozzle and the fluid to be sprayed contained within the vessel, substantially as described.

10. In an atomizing device, the combination with a fluid-containing vessel, of a cylinder within the same and adapted to contain a lubricant having its interior sealed with respect to the vessel in a manner to maintain the fluid in the vessel and the lubricant in the cylinder in separate bodies, a bent or curved pipe extending through the bottom of the cylinder a sufficient distance above said bottom to afford a space for the lubricant and extending into the vessel a sufficient distance above the bottom thereof to afford a space for the fluid to be sprayed, a spraying-nozzle and a duct or pipe establishing communication between the spraying-nozzle and the fluid to be sprayed contained within the vessel, substantially as described.

11. In an atomizing device, the combination with a vessel for containing fluid to be atomized, of a cylinder projecting within the vessel, an air-duct establishing communication between the cylinder and the vessel, the said duct projecting into the cylinder so that oil may surround the same without finding passage through the duct into the inclosing vessel, a piston within the cylinder for forcing air through said duct and a nozzle in communication with the fluid to be sprayed through which nozzle the air and fluid pass, the said air-duct projecting sufficiently above the bottom of the vessel to afford space for the fluid in the vessel, substantially as described.

12. In an atomizing device, the combination with a fluid-containing vessel, of a cylinder projecting within the same and adapted to contain a lubricant, a duct projecting into the cylinder and establishing communication between the cylinder and the vessel for the passage of air, a piston working within the cylinder for forcing air through the duct, the cylinder having its interior sealed with respect to the vessel in a manner to maintain the fluid in the vessel and lubricant in the cylinder below the piston in separate bodies, and a nozzle in communication with the fluid to be sprayed, through which nozzle air and fluid pass, substantially as described.

13. In an atomizing device, the combination with a fluid-containing vessel, of a cylinder adapted to contain a lubricant, a duct establishing communication between the cylinder and the vessel for the passage of air, a piston working within the cylinder for forcing air through the duct, the cylinder having its interior sealed with respect to the vessel in a manner to maintain the fluid in the vessel and lubricant in the cylinder below the piston in separate bodies, and a nozzle in communication with the fluid to be sprayed, through which nozzle air and fluid pass, substantially as described.

14. In an atomizing device, the combination with a vessel for containing fluid to be atomized, of a cylinder, an air-duct establishing communication between the cylinder and the vessel, the said duct projecting into the cylinder so that oil may be contained within the cylinder without finding passage through the duct into the vessel, means for forcing air through said duct and a nozzle in communication with the fluid to be sprayed, through which nozzle the air and fluid pass, substantially as described.

15. In an atomizing device, the combination with a vessel for containing fluid to be atomized, of a cylinder, an air-duct establishing communication between the cylinder and the vessel, the said duct projecting into the cylinder so that oil may be contained within the cylinder without finding passage through the duct into the vessel, a piston within the cylinder for forcing air through said duct and a nozzle in communication with the fluid to be sprayed, through which nozzle the air and fluid pass, substantially as described.

16. In an atomizing device, the combination with a fluid-containing vessel, of a cylinder adapted to contain a lubricant, a duct projecting into the cylinder and establishing communication between the cylinder and the vessel for the passage of air, a piston working within the cylinder for forcing air through the duct, the cylinder having its interior sealed with respect to the vessel in a manner to maintain the fluid in the vessel and lubricant in the cylinder below the piston in separate bodies, and a nozzle in comunication with the fluid to be sprayed, through which nozzle air and fluid pass, substantially as described.

In witness whereof I hereunto subscribe my name this 22d day of October, A. D. 1903.

WALTER SAMS.

Witnesses:
G. L. CRAGG,
C. M. CRAWFORD.